United States Patent [19]

Tsujino

[11] Patent Number: 5,180,961
[45] Date of Patent: Jan. 19, 1993

[54] BATTERY CHARGING APPARATUS

[75] Inventor: Kazuhiro Tsujino, Osaka, Japan

[73] Assignee: Sanyo, Electric Co., Ltd., Osaka, Japan

[21] Appl. No.: 434,131

[22] Filed: Nov. 8, 1989

[30] Foreign Application Priority Data

Nov. 11, 1988 [JP] Japan ................ 63-286059

[51] Int. Cl.$^5$ .............................. H02J 7/00
[52] U.S. Cl. ...................... 320/20; 320/37; 320/39
[58] Field of Search ............ 320/20, 21, 40, 39, 320/37, 38

[56] References Cited

U.S. PATENT DOCUMENTS

| | | | |
|---|---|---|---|
| 4,118,661 | 10/1978 | Siekierski et al. | 320/40 |
| 4,392,101 | 7/1983 | Saar et al. | 320/20 |
| 4,746,852 | 5/1988 | Martin | 320/20 |
| 4,806,840 | 2/1989 | Alexander et al. | 320/20 |

FOREIGN PATENT DOCUMENTS

| | | |
|---|---|---|
| 0147241 | 7/1985 | European Pat. Off. . |
| 0181112 | 10/1986 | European Pat. Off. . |
| 3344208 | 1/1985 | Fed. Rep. of Germany . |
| 1-160327 | 6/1989 | Japan . |

OTHER PUBLICATIONS

Patent Abstracts of Japan vol. 013, No. 433 (E-824) Sep. 27, 1989, 160327, Jun. 23, 1989.

*Primary Examiner*—R. J. Hickey
*Attorney, Agent, or Firm*—Stanger, Stempler & Dreyfus

[57] ABSTRACT

A battery charging apparatus includes a charger to which a battery to be charged is loaded and a charge controller which controls a charge in the charger. A terminal voltage of the battery loaded in the charger is sampled and A/D converted by a microcomputer of the charge controller at time intervals. At every timing when a new sampled value is stored in a memory, the new sampled value is compared with a maximum sampled value which has been stored in the memory before that time. When the new sampled value is smaller than the maximum sampled value by a predetermined value ($\Delta V$), a full-charge signal is outputted. In addition, when a state where the new sampled value is larger than the maximum sampled value continues for a predetermined time period or more, the maximum sampled value is updated.

13 Claims, 5 Drawing Sheets

BATTERY CHARGING APPARATUS

BACKGROUND OF THE INVENTION

1. Field of the invention

The present invention relates to a battery charging apparatus. More specifically, the present invention relates to a full-charge detecting apparatus which detects a fully charged state of a chargeable battery such as a Ni-Cd battery when such a battery is rapidly charged.

2. Description of the prior art

One example of a full-charge detecting apparatus provided in a battery charging apparatus so as to detect that a battery is fully charged is disclosed in, for example, Japanese Patent Publication No. 18177/1985 published on May 9, 1985, and U.S. Pat. No. 4,792,743 issued on Dec. 20, 1988.

In either one of the above described prior arts, a full-charge is detected by utilizing a characteristic of a terminal voltage of a battery being charged. More specifically, in accordance with such a characteristic of the terminal voltage of the battery being charged, as shown in FIG. 5, a peak point A of the terminal voltage appears shortly before the battery enters a fully charged state and the terminal voltage gradually decreases after the peak point A. Therefore, when the terminal voltage becomes lower than the terminal voltage at the peak point A by a predetermined value ($\Delta V$) or more, it is detected that the battery enters a fully charged state.

In either one of the above described prior arts, no measures are taken to deal with a case where a terminal voltage of a battery being charged abnormally varies due to a noise or the like. Therefore, in the prior arts, in a case where the terminal voltage is temporarily raised due to a noise as shown by a difference character B in FIG. 6, the voltage which is raised by the noise is erroneously held as a terminal voltage at a peak point, and consequently, a full-charge may, in some cases, be detected before the terminal voltage actually enters a fully charged state. In addition, in a case where a contact resistance between a charger and a battery is increased due to vibration or the like during a charge and thus the terminal voltage is temporarily decreased as shown by a reference character C in FIG. 7, since it is determined that the terminal voltage decreases more than the predetermined value ($\Delta V$), a full-charge may, in some cases, be erroneously detected.

SUMMARY OF THE INVENTION

Therefore, a principal object of the present invention is to provide a novel battery charging apparatus.

Another object of the present invention is to provide a battery charging apparatus in which a fully charged state of a battery is not erroneously detected.

The other object of the present invention is to provide a battery charging apparatus capable of reliably detecting a full-charge with no malfunction even if a terminal voltage of a battery being charged temporarily varies.

A battery charging apparatus in accordance with the present invention comprises a sampling means for sampling a terminal voltage of a battery being charged at predetermined time intervals; a storing means for storing a maximum sampled value; means for outputting a full-charge signal when a new sampled value is smaller than the maximum sampled value by a predetermined value or more; and an updating means for updating the maximum sampled value when a state where the new sampled value is larger than the maximum sampled value continues for a predetermined time period or more.

In accordance with the present invention, since a maximum sampled value is updated only when a state where a new sampled value is larger than the maximum sampled value continues for a predetermined time period or more, even if a terminal voltage of a battery being charged is temporarily increased due to a noise or the like as shown in FIG. 6, for example, a fully charged state is not erroneously detected.

In an embodiment in accordance with the present invention, a detecting means for detecting that a new sampled value continuously decreases for a predetermined time period or more is provided, and the output means outputs a full-charge signal in response to a detection output of the detecting means in a state where the new sampled value is smaller than the maximum sampled value by the predetermined value or more.

In accordance with this embodiment, even if a terminal voltage of a battery being charged is drastically decreased before a peak point thereof as shown in FIG. 7, for example, it is possible to surely detect a fully charged state after the peak point.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENT

Figure 1:
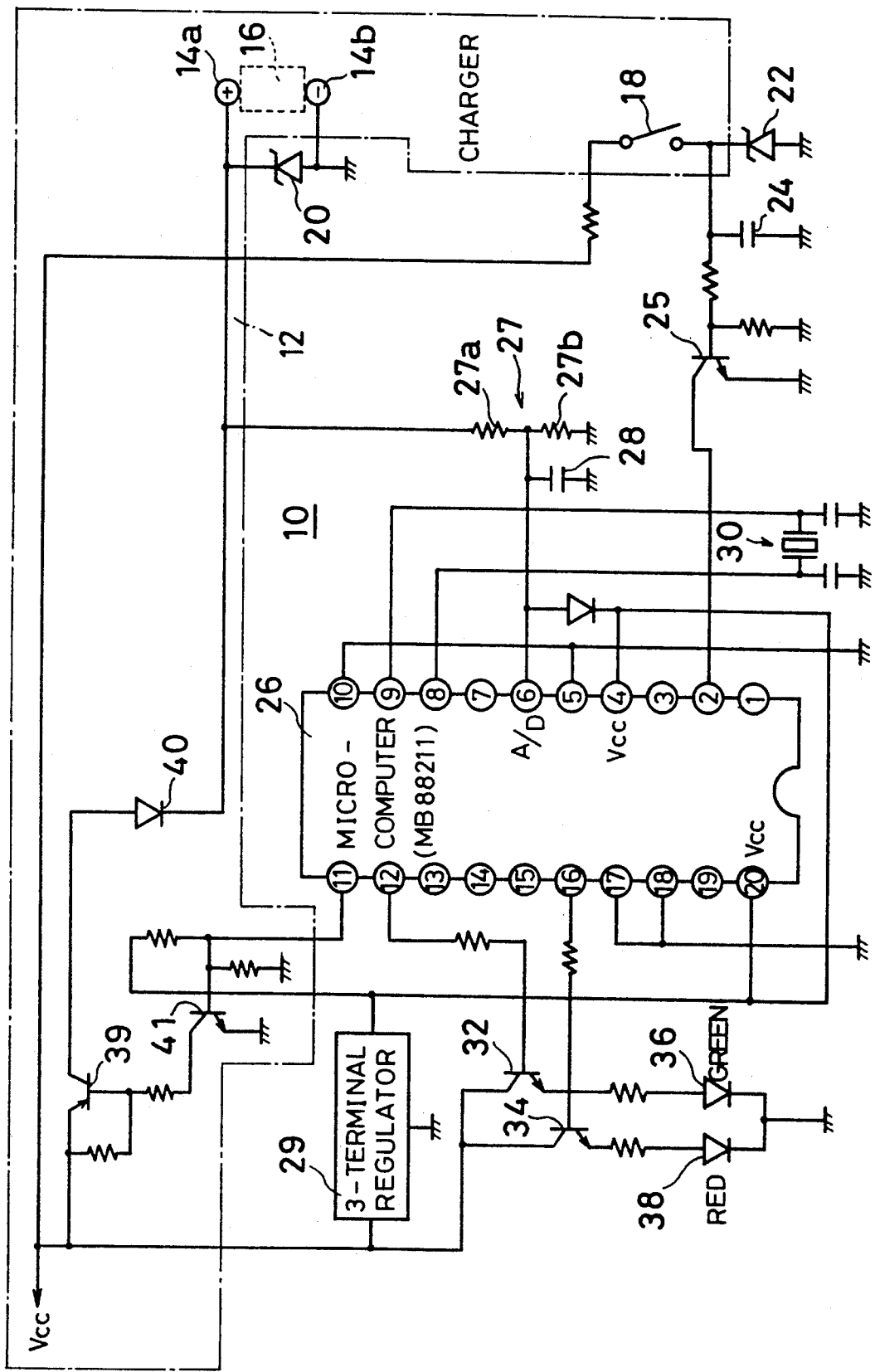
FIG. 1 is a circuit diagram showing one embodiment in accordance with the present invention.

With reference to FIG. 1, a charge controller 10 of this embodiment shown is connected to a charger 12. The charger 12 includes terminals 14a and 14b which are respectively connected to a plus terminal and a minus terminal of a battery 16 to be charged. A direct current voltage (charging voltage) from a constant current power source Vcc is applied to the terminals 14a and 14b. In addition, the charger 12 includes a switch 18 which is turned-on when the battery 16 is loaded to the charger 12.

In the charge controller 10, a zener diode 20 for preventing a spike voltage from being generated is connected between the terminals 14a and 14b of the charger 12. In addition, one contact of the switch 18 is connected to the voltage source Vcc and the other contact is connected to the ground through a protective Zener diode 22. Furthermore, a capacitor 24 for preventing chattering is connected in parallel with the Zener diode 22.

The charge controller 10 is controlled as a whole by a microcomputer 26. As this microcomputer 26, it is possible to utilize a chip of "MB88211" manufactured by Fujitsu. The other contact of the above described switch 18 is connected to the second terminal of the microcomputer 26 through a transistor 25 which is utilized for protecting the second terminal. The transistor 25 is turned-on when the switch 18 is turnedon so that the second terminal becomes a low level. In addition, a voltage at a plus terminal 14a of the above described charger 12, that is, a terminal voltage of the battery 16 being charged is applied to a capacitor 28 through a voltage-dividing circuit 27 which is composed of resistors 27a and 27b. An output voltage of the voltage-dividing circuit 27 is integrated by the capacitor 28, and an integrated voltage is applied to the sixth terminal of the microcomputer 26. The microcomputer 26 incorporates an A/D converting function, and therefore, the microcomputer 26 converts a voltage of a capacitor 28 which is applied to the sixth terminal into digital data every time a conversion command is applied thereto.

A fourth terminal and twentieth terminal of the microcomputer 26 are utilized as voltage source terminals to which an output from a 3-terminal regulator 29 which receives the voltage source Vcc is applied. As this 3-terminal regulator 29, it is possible to utilize "LVC550C" manufactured by Mitsumi. In addition, a fifth terminal, tenth terminal, seventeenth terminal and eighteenth terminal of the microcomputer 26 are commonly connected to the ground. Then, a clock circuit 30 is constructed by utilizing an eighth terminal and ninth terminal of the microcomputer 26.

A twelfth terminal and sixteenth terminal of the microcomputer 26 are respectively connected to bases of transistors 32 and 34 collectors of which are commonly connected to the voltage source Vcc. Emitters of the transistors 32 and 34 are respectively connected to light emitting diodes 36 and 38 through suitable currentlimitting resistors. The light emitting diode 36 is green and the light emitting diode 38 is red. Therefore, when a charge of the battery 16 is started in response to turning-on of the switch 18 of the charger 12, a high level signal is outputted from the sixteenth terminal to turn the transistor 34 on, and therefore, the red light emitting diode 38 is lighted. In addition, when the battery 16 enters a fully charged state, the output of the sixteenth terminal assumes a low level and thus the red light emitting diode 38 is put-out, while an output of the twelfth terminal assumes a high level to turn the transistor 32 on, and therefore, the green light emitting diode 36 is lightened. Therefore, a user is notified that a rapid or fast charge of the battery 16 is completed lighting of the green light emitting diode 36.

In addition, a series connection of a transistor 39 and Shottky diode 40 is connected between the terminal 14a of the charger 12 and the voltage source Vcc. The Shottky diode 40 prevents a current from reversely flowing from the terminal 14a to the voltage source Vcc. Furthermore, a transistor 41 is connected between a base of the transistor 39 and the ground, and a base of the transistor 41 is connected to the eleventh terminal of the microcomputer 26 and the output of the 3-terminal regulator 29. The eleventh terminal of the microcomputer is a high level during a charge and the same becomes a low level when the battery enters a fully charged state. Therefore, when a fully charged state is detected, the eleventh terminal becomes a low level so that the transistor 41 is turned-off and the transistor 39 is turned-off. Therefore, after a fully charged state is detected, no charging voltage is applied to a plus terminal 14a since the transistor 39 is turned-off.

Figure 2:
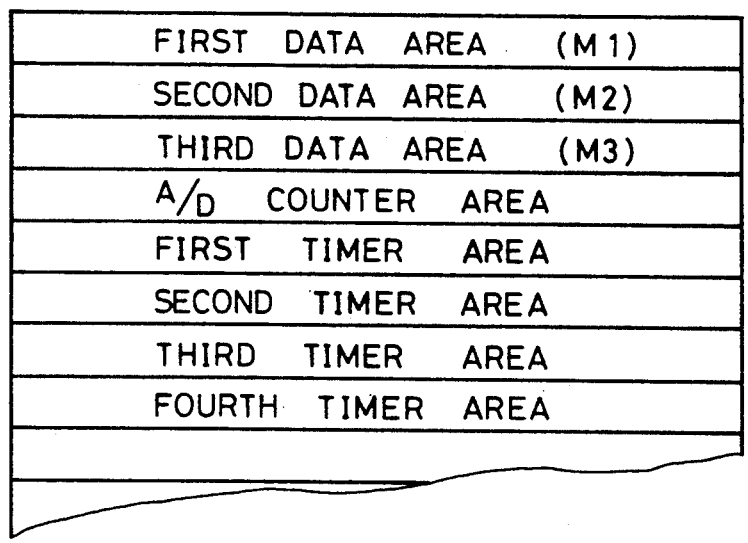
FIG. 2 illustrative view schematically showing a memory map of a microcomputer included in FIG. 1 embodiment.
Figure 3:
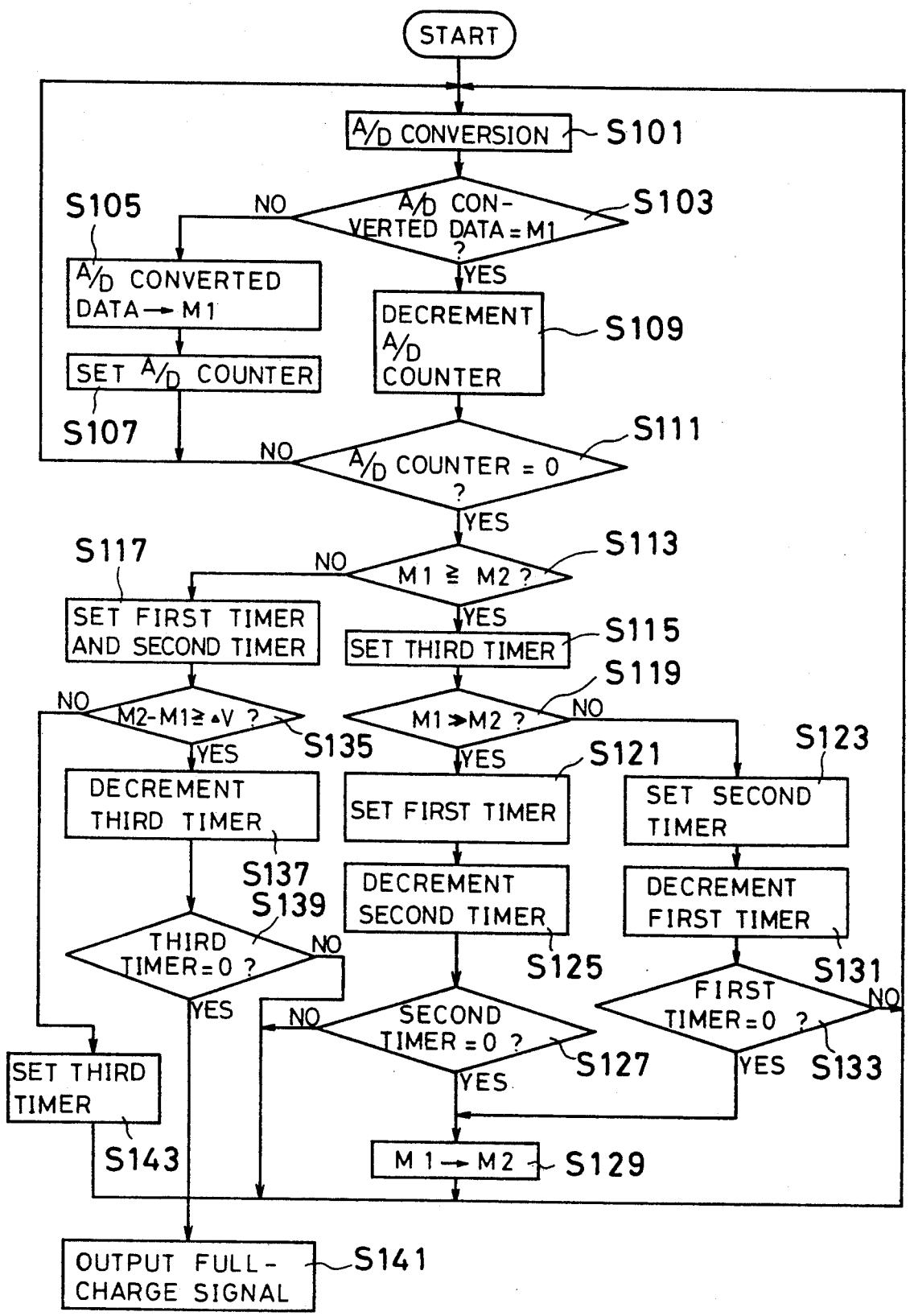
FIG. 3 is a flowchart showing an action or operation of FIG. 1 embodiment.

When the switch 18 of the charger 12 is turned-on, in response to a signal thereof, a routine shown by a flowchart in FIG. 3 is started. In the first step S101 in FIG. 1, in response to a conversion command, the microcomputer 26 A/D converts a voltage of the capacitor 28 which is inputted to the sixth terminal, that is, a terminal voltage of the battery 16 being charged (a voltage-divided voltage by the voltage-dividing circuit 27) into a digital data. Then, in the next step S103, it is determined whether or not the digital data thus A/D converted is equal to the data which has been stored before that time in a first data area M1 shown in FIG. 2. When "NO" is determined in the step S103, in the next step S105, the A/D converted data is stored in the first data area M1. In the succeeding step S107, a predetermined numeral value, for example, "10" is set in an A/D counter area shown in FIG. 2. The A/D counter is decremented for each conversion command described above. When "YES" is determined in the step S103, in the step S109, the A/D counter which is set in the previous step S107 is decremented. In the succeeding step S111, it is determined whether or not the A/D counter becomes zero.

Thus, at every A/D conversion operation in the step S101, the steps S103–S111 are executed. Therefore, when a sampled voltage of the capacitor 28, that is, a sampled terminal voltage of the battery 16 being charged is the same value during a predetermined number of times being set in the A/D counter, the data being stored in the first data area is regarded as a normal new sampled value and utilized after the step S113. In addition, a reason why the A/D counter is used is for preventing an error sampled value due to a noise or the like from being taken into the microcomputer 26.

In the step S113, the data of the first data area M1 which is updated in the above described step S105 is compared with the data of a second data area M2 shown in FIG. 2. As easily understood through a later description, the second data area M2 is an area for storing a maximum sampled value. Therefore, in the step S113, a new sampled value is compared with a maximum sampled value. When the new sampled value is larger than the maximum sampled value, that is, M1≧M2, a process proceeds to the step S115.

Figure 5:
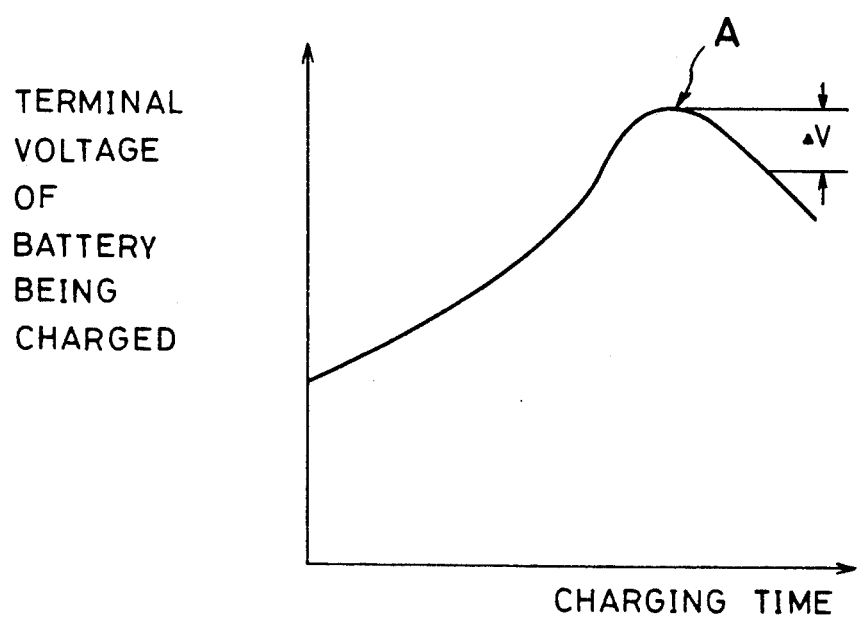
FIG. 5 is a graph showing a normal changing characteristic of a terminal voltage of a battery being charged.

Since the terminal voltage, in a normal case, gradually increases up to the peak point A as shown in FIG. 5, the step S115 is executed until the terminal voltage reaches the peak point A. Inversely, since the terminal voltage, in a normal case, gradually decreases after passing the peak point A, at that time, "NO" is determined in the step S115, and therefore, a process proceeds to the step S117.

In the step S115, a predetermined timer time, for example, 40 seconds is set in a third timer area as shown in FIG. 2. The third timer is utilized in a process after the previous step S117.

In the step S119 following to the step S115, it is determined whether or not the new sampled value is larger than the maximum sampled value by a predetermined value or more, that is, M1>M2. For example, in a case where the first data area and the second data area as shown in FIG. 2 are both 8-bit areas, when the data of the first data area M1 is larger than the data of the second data area M2 by two steps of 8-bit data or more, in this step S119, "YES" is determined. When "YES" is determined in the step S119, a process proceeds to the step S121 and, when "NO" is determined, a process proceeds to the step S123.

In the step S121, a predetermined timer time, for example, 3 seconds is set in a first timer area as shown in FIG. 2. The first timer is utilized in a process after the step S123. Then, in the step S125 following to the step S121, a second timer area as shown in FIG. 2 is decremented. In the second timer area, a predetermined timer time, for example, 40 seconds is set in a step after the step S117 or the step S123. Then, in the step S127, it is determined whether or not the second timer becomes zero. When the second timer becomes zero, that is, the timer time being set in the second timer area elapses, in the step S129, the new sampled value being stored in the first data area M1 is stored in the second data area M2 as a maximum sampled value.

In addition, when "NO" is determined in the step S119, in the step S123, a predetermined timer time is set in the above described second timer area. Then, in the step S131 following to the step S123, the first timer in which a predetermined timer time is set in the previous step S117 or S121 is decremented. Then, when it is determined in the step S133 that the first timer area becomes zero, that is, the timer time being set in the first timer area laps, a process proceeds to the above described step S129.

As described above, when "NO" is determined in the step S113, a process proceeds to the step S117, and in the step S117, predetermined timer times, for example 3 seconds and 40 seconds are respectively set in the first timer area and the second timer area. In the step S135 following to the step S117, it is determined whether or not the new sampled value being stored in the first data area M1 is larger than the maximum sampled value being stored in the second data area M2 by a predetermined value (ΔV) or more, that is, M2−M1=≧ΔV. In addition, the ΔV is set approximately 100 mV when a normal voltage of the battery 16 is 6V, for example. However, the ΔV is proportionally changed in accordance with the normal voltage of the battery to be charged. Then, when "YES" is determined in the step S135, in the step S137, the third timer in which the timer time is set in the previous step S115 is decremented and, in the step S139, it is determined whether or not the third timer becomes zero, that is, the timer time being set in the third timer laps. When "YES" is determined in the step S139, in the step S141, a full-charge signal is outputted from, for example, the twelfth terminal of the microcomputer 26.

In addition, when "NO" is determined in the previous step step S135, in the step S143, in a similar way to that in the previous step S115, a predetermined timer time is set in the third timer area, and thereafter, a process returns to the first step S101. In a similar manner, when "NO" is determined in either one of the steps S127, S133 and S139, a process returns to the step S101.

With reference to FIG. 5, since the terminal voltage gradually increases from a starting time point of the charge to a timing when the terminal voltage reaches the peak point A, in the step S113, "YES" is determined. Therefore, the steps after the step S115 are executed. Then, if a state where M1≧M2 and M1>M2 continues for the timer time being set in the second timer area, the step S129 is executed so that the maximum sampled value of the second data area M1 is substituted with the new sampled value at the time. In addition, when a state where M1≧M2 and a difference between M1 and M2 is small continues for the timer time being set in the first timer area, in the step S129, the maximum sampled value is similarly updated. Therefore, when a noise shown by the reference character B in FIG. 6 exists, "YES" is, in some cases, determined in the both steps S113 and S119. However, a continuation time of such a noise is very short, "NO" will be determined in the step S113 or S119 and the second timer is set in the step S117 or S123 until the second timer becomes zero in the step S123. Consequently, the step S129 can not be executed until the noise disappears, and therefore, the maximum sampled value is not updated. Even if the noise level is small as such that "NO" is determined in the step S119, the noise disappears until the timer time being set in the first timer becomes zero, and therefore, in such a case, the maximum sampled value is also not updated in the step S129. Therefore, even if the terminal voltage is temporarily increased due to an influence of the noise as shown in FIG. 6 from the start of the charge to the peak point of the terminal voltage, the terminal voltage which is temporarily increased is not erroneously recognized as a voltage at the peak point.

Next, a timing when "NO" is determined in the step S113 is after the peak point A in FIG. 5. Then, if a state of M2−M1≧=ΔV continues for the timer time being set in the third timer area, at that time, a full-charge signal is obtained in the step S141.

Figure 6:
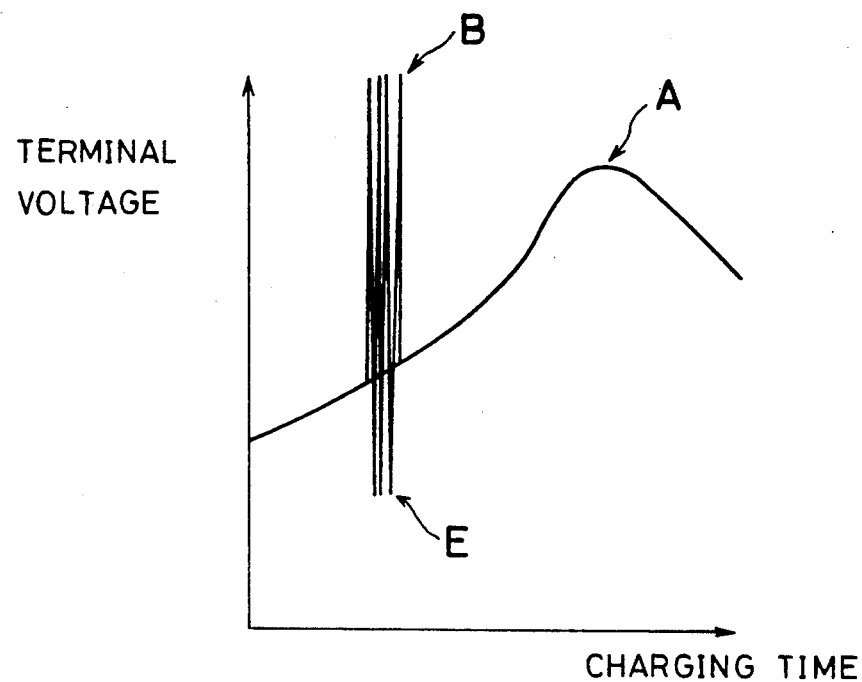
FIG. 6 is a graph showing a state where a terminal voltage is varied due to a noise.

However, even if the terminal voltage is temporarily decreased before the peak point A as shown by the reference character E in FIG. 6, "NO" is determined in the step S113. However, since such temporary decrease of the terminal voltage does not continue for the timer time being set in the third timer area or more, "NO" is determined in the step S139, and consequently, no full-charge signal is outputted.

Figure 4:
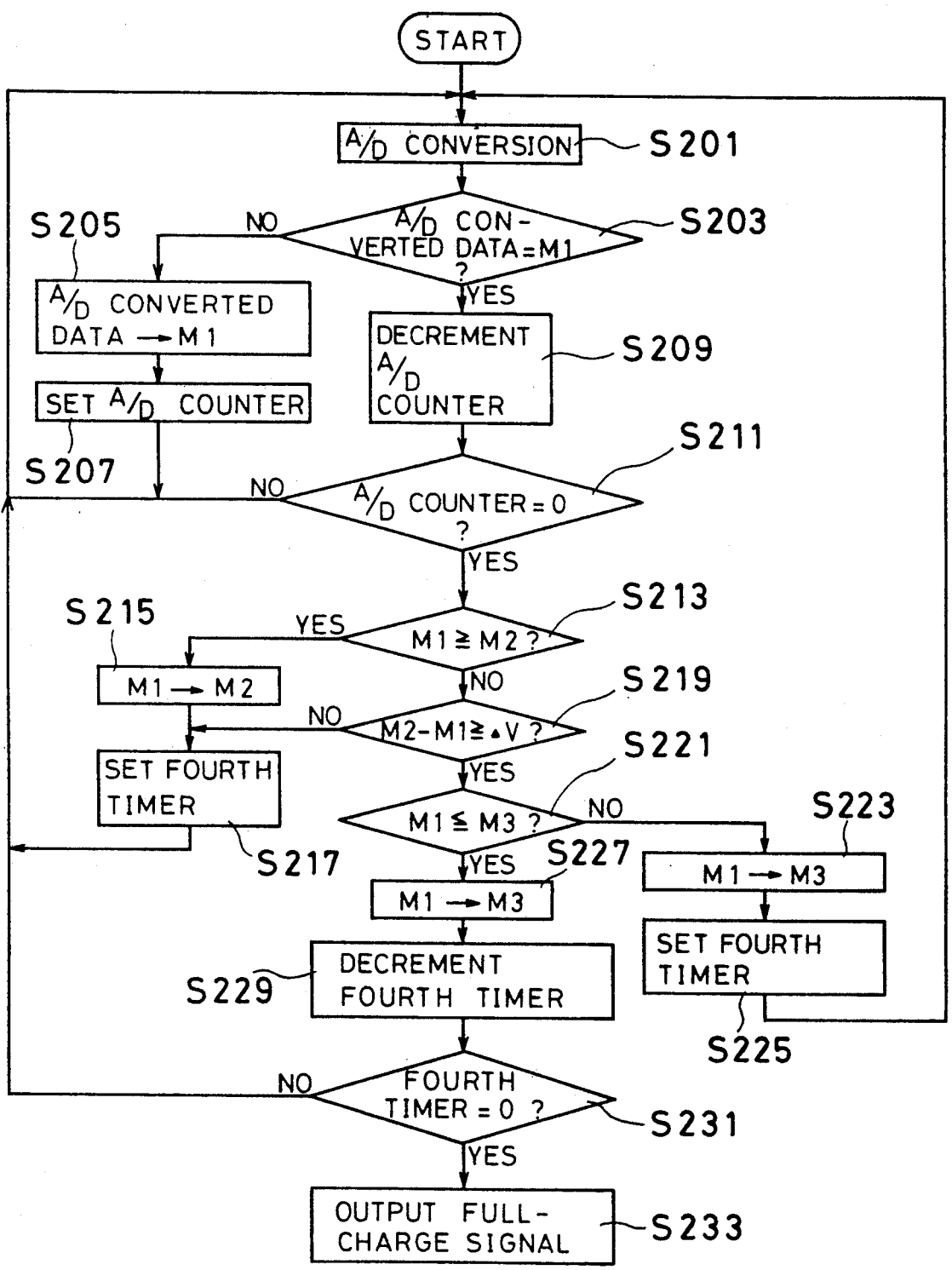
FIG. 4 is a flowchart showing a further action or operation of embodiment.

FIG. 4 is a flowchart showing a further action or operation of FIG. 1 embodiment. Since the steps S201–S213 shown in FIG. 4 are the same as the steps S101–S113 shown in FIG. 3, a duplicate description will be omitted here.

When "YES" is determined in the step S213, the battery 16 being charged remains in a state where the terminal voltage thereof has not reached the peak point A (FIG. 5), and therefore, in the next step S215, the new sampled value being stored in the first data area M1 is stored in the second data area M2 as the maximum sampled value. In addition, as an updating method of the maximum sampled value, FIG. 3 embodiment may be utilized in this embodiment. Then, in the next step S217, a predetermined timer time, for example, 45 seconds is set in a fourth timer area as shown in FIG. 2, and thereafter, a process returns to the first step S201.

When the terminal voltage of the battery 16 being charged passed the peak point A, "NO" is determined in the step S213, and therefore, in the step S219 following to the step S213, as similar to the step S135 in FIG. 3, it is determined whether or not the maximum sampled value is larger than the new sampled value by a predetermined value (ΔV) or more. When "NO" is determined in the step S219, a process proceeds to the previous step S217.

Then, when "YES" is determined in the step S219, in the step S221, it is determined whether or not the data being stored in a third data area M3 as shown in FIG. 2 is larger than the new sampled value of the first data area, that is, M1≦M3. In addition, the third data area M3 is an area for storing a minimum sampled value after the start of the charge. If "NO" is determined in the step S221, in the succeeding step S223, the new sampled value of the first data area M1 is stored in the third data area M3 and, in the succeeding step S225, as similar to the previous step S217, a predetermined timer time is set in the fourth timer area, and thereafter, a process returns to the first step S201.

When "YES" is determined in the step S221, as similar to the previous step S223, in the succeeding step S227, the new sampled value of the first data area M1 is stored in the third data area M3. In the next step S229, the fourth timer which is set in the previous step S217 or S225 is decremented. Then, in the step S231, it is determined whether or not the fourth timer becomes zero, that is, whether or not the timer time being set in the fourth timer area has lapsed. Then, if "NO" is determined in the step S231, a process returns to the first step S201 and, if "YES" is determined, a full-charge signal is outputted in the next step S223.

Figure 7:
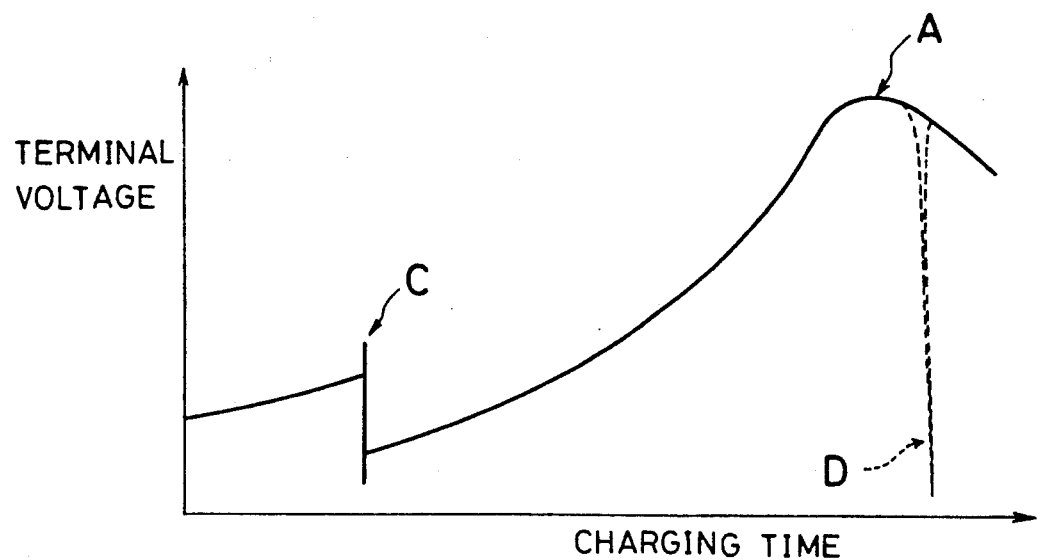
FIG. 7 is a graph showing a state where a terminal voltage is varied by a change of a contact resistance.

Since a minimum value of the terminal voltage of the battery 16 being charged is stored in the third data area M3, in the step S221, normally, "YES" is determined. However, in a case where the terminal voltage largely drops as shown by the reference character C in FIG. 7, "NO" is determined in the step S221. Therefore, in this case, after the minimum sampled value is updated in the step S223, the predetermined timer time is set in the fourth timer area. Then, only when a state of M1≦M3 continues for the timer time of the fourth timer or more, it is determined that a normal operation is performed, and the full-charge signal is outputted in response thereto in the step S223. In other words, even if the temporary drop of the terminal voltage shown by the reference character C occurs, when the terminal voltage increases within the fourth timer time, for example, in a case after the point C in FIG. 7, no full-charge signal is outputted in response to the drop.

In addition, when "YES" is determined in the step S221, the minimum sampled value (M3) is also updated in the step S227. The reason is that even if the terminal voltage is further followed due to a noise or the like as shown by a reference character D in FIG. 7, it is possible to prevent an erroneous operation from occurring. More specifically, in a case where the terminal voltage is decreased due to a noise or the like as shown by the reference character D in FIG. 7, if a decreased terminal voltage has been stored in the third data area M3 and the data of the third data area M3 could not be updated, "NO" is always determined in the step S221 even when a normal terminal voltage which is not affected by a noise or the like is stored in the first data area M1, and therefore, it becomes impossible to detect a fully charged state of the battery 16. Therefore, in order to avoid such an erroneous operation, the minimum sampled value M3 is always updated in the embodiment shown.

In addition, FIG. 3 and FIG. 4 respectively shows different aspects of an action or operation; however, in the present invention, it is not necessary to say that FIG. 3 and FIG. 4 may be suitably combined with each other.

Furthermore, in this embodiment shown, in order to perform the action or operation shown in FIG. 3 and FIG. 4, a microcomputer is utilized; however, it is not necessary to say that the present invention may be constructed by a hardware circuitry which performs the same or similar to functions of FIG. 3 and FIG. 4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A battery charging apparatus, comprising:
   sampling means for sampling a terminal voltage of a battery being charged at time intervals;
   storing means for storing a maximum sampled value;
   outputting means for outputting a full-charge signal when a new sampled value is smaller than the maximum sampled value by a predetermined value or more; and
   updating means for updating the maximum sampled value of said storing means when a condition where said new sampled value is larger than said maximum sampled value continues for a predetermined time or more.

2. A battery charging apparatus in accordance with claim 1, wherein said updating means includes means for updating said maximum sampled value when a condition where said new sampled value is larger than said maximum sampled value but a difference between the larger sampled value and the maximum value is less than a predetermined value continues for a first preset time or more.

3. A battery charging apparatus in accordance with claim 2, wherein said updating means includes means for updating said maximum sampled value when a condition where said new sampled value is larger than said maximum sampled value and a difference between the larger sampled value and the maximum value is more than a predetermined value continues for a second preset time or more.

4. A battery charging apparatus in accordance with claim 1, wherein said updating means includes means for updating said maximum sampled value when a condition where said new sampled value is larger than said maximum sampled value and a difference between the larger sampled value and the maximum value is more than a predetermined value continues for a second preset time or more.

5. A battery charging apparatus in accordance with claim 3, wherein said first preset time is set to be shorter than said second preset time.

6. A battery charging apparatus in accordance with claim 1, further comprising detecting means for detecting that the terminal voltage of the battery being charged continuously decreases for the predetermined time or more, wherein said outputting means outputs the full-charge signal in response to a detection of said means when said new sampled value is smaller than said maximum sampled value by the predetermined value or more.

7. A battery charging apparatus, comprising:
   sampling means for a sampling a terminal voltage of a battery being charged at time intervals;
   storing means for storing a maximum sampled value;
   comparing means for comparing a new sampler value with said maximum sampled value of said storing means;
   updating means for updating said maximum sampled value when said new sampled value is larger than said maximum sampled value;

detecting means responsive to the sampled values of said sampling means for detecting that said terminal voltage continuously decreases for a predetermined time or more; and outputting means for outputting a full-charge signal in response to a detection of said detecting means when said new sampled value is smaller than said maximum sampled value by a predetermined value or more.

8. A battery charging apparatus, comprising:

sampling means for sampling a terminal voltage of a battery being charged at time intervals to obtain sampled values;

storing means for storing a maximum sampled value;

means for comparing a new sampled value with the maximum sampled value and outputting a full-charge signal when a new sampled value is smaller than the maximum sampled value by a predetermined value or more; and means for generating a predetermined time and updating the maximum sampled value of said storing means when a condition where said new sampled value is larger than said maximum sampled value continues for the predetermined time or more.

9. A battery charging apparatus in accordance with claim 8, wherein said means for generating and updating includes means for updating said maximum sampled value when a condition where said new sampled value is larger than said maximum sampled value but a difference between the larger sampled value and the maximum value is less than a predetermined values continues for a first preset time or more.

10. A battery charging apparatus is accordance with claim 9, wherein said updating means includes means for updating said maximum sampled value when a state where said new sampled value is larger than said maximum sampled value and a difference between the larger sampled value and the maximum value is more than a predetermined value continues for a second preset time or more.

11. A battery charging apparatus in accordance with claim 8, wherein said updating means includes means for updating said maximum sampled value when a condition where said new sampled value is larger than said maximum sampled value and a difference between the larger sampled value and the maximum value is more than a predetermined value continues for a second preset time or more.

12. A battery charging apparatus in accordance with claim 10, wherein said first preset time is set to be shorter than said second preset time.

13. A battery charging apparatus in accordance with any one of claims 8 through 11, further comprising detecting means or detecting that the terminal voltage of the battery being charged continuously decreases for the predetermined time or more, wherein said outputting means outputs the full-charge signal in response to a detection of said detecting means when said new sampled value is smaller than said maximum sampled value by the predetermined value or more.

* * * * *